June 19, 1928.
C. H. SEMPLE
1,674,574
COOLING APPARATUS FOR RUBBER TUBING
Original Filed April 29, 1925 2 Sheets-Sheet 1
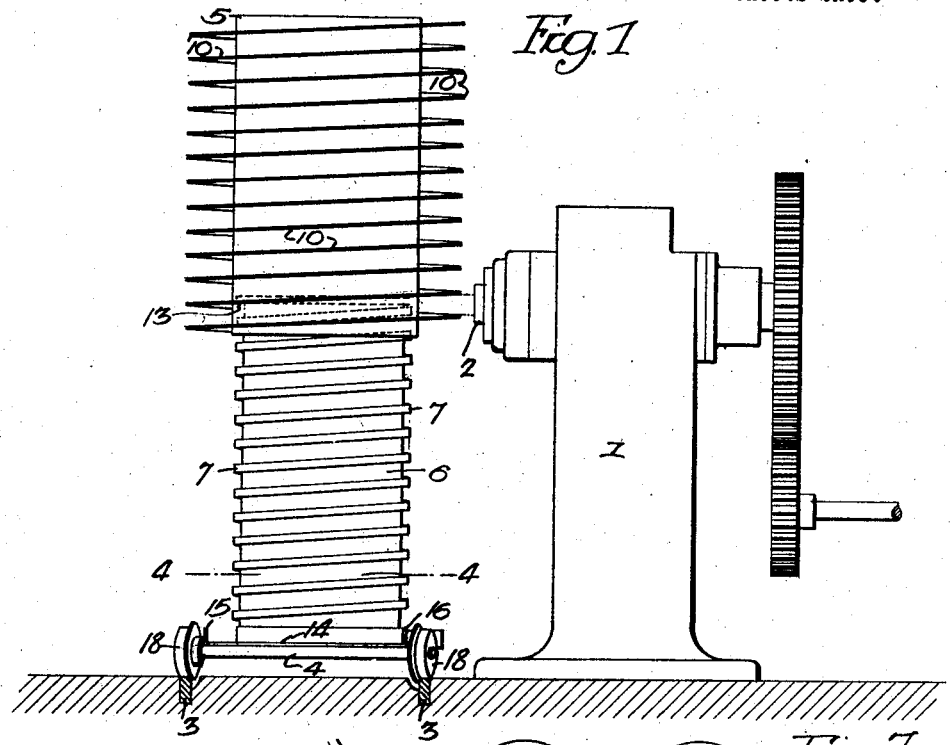
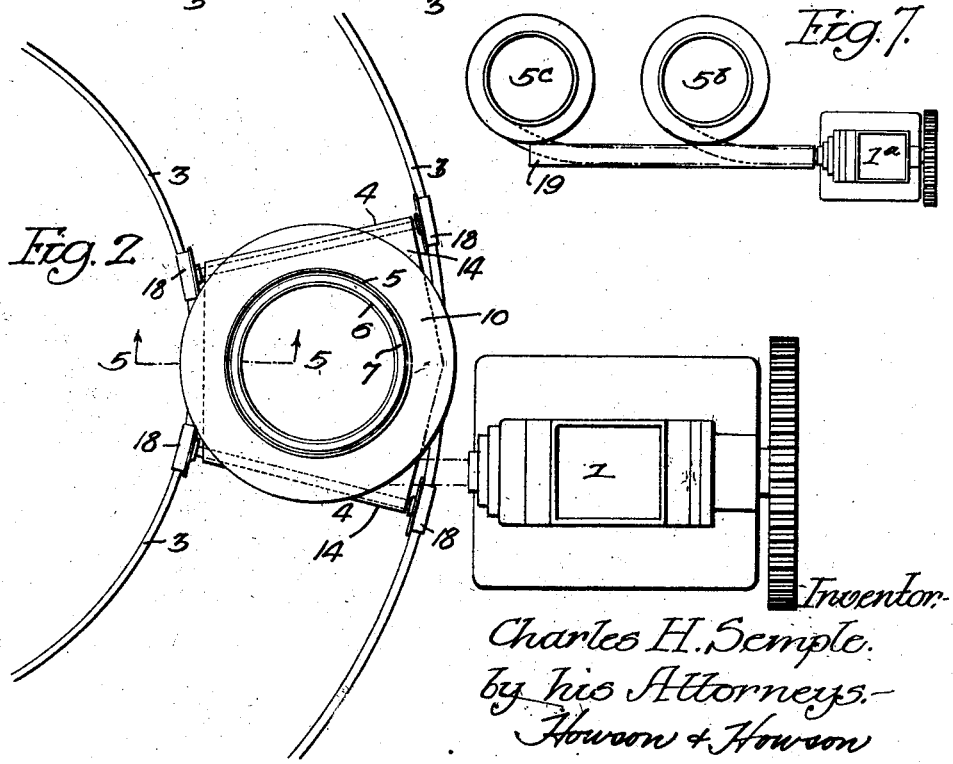
Inventor-
Charles H. Semple.
by his Attorneys,-
Howson & Howson June 19, 1928.
C. H. SEMPLE
1,674,574
COOLING APPARATUS FOR RUBBER TUBING
Original Filed April 29, 1925  2 Sheets-Sheet 2
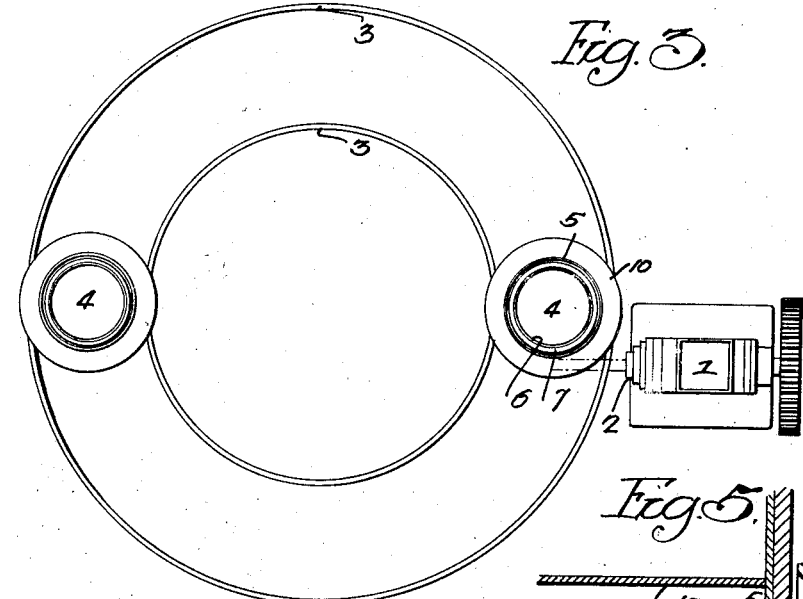
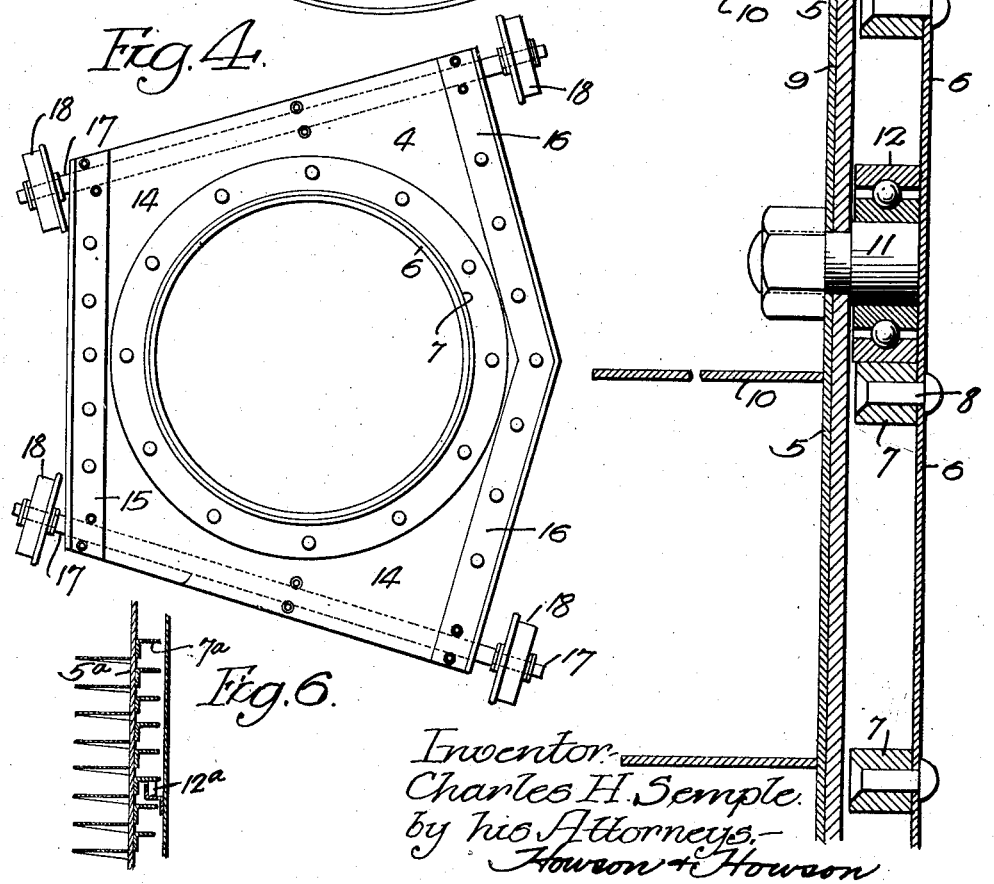
Inventor.
Charles H. Semple
by his Attorneys.
Howson & Howson Patented June 19, 1928.

1,674,574

UNITED STATES PATENT OFFICE.

CHARLES H. SEMPLE, OF YOUNGSTOWN, OHIO, ASSIGNOR, BY DIRECT AND MESNE ASSIGNMENTS, TO SEMPLE-LEE PROCESSES, INC., OF AKRON, OHIO, A CORPORATION OF DELAWARE.

COOLING APPARATUS FOR RUBBER TUBING.

Application filed April 29, 1925, Serial No. 26,823. Renewed October 30, 1926.

This invention relates to apparatus for the manufacture of endless rubber tubes such, for example, as are employed as inner tubes for pneumatic tires.

My chief object is to provide, and especially in combination with an extruding or tubing machine whereby the rubber stock is extruded as a straight, continuous tubular structure, means whereby such a structure conveniently may be given progressively a longitudinally curved form, preferably while it is hot, as it is upon its emergence from the tubing machine, and whereby it may be accurately held in curved form while it cools, as in a helix, for example, so that it may be set in a longitudinally curved form closely approximating that which it is to have in the finished annular tube, and without permanent wrinkling or buckling of its inner peripheral wall as an incident of its being bent to the curved form.

Further objects are to provide a cooling drum adapted so to receive and to support tubular stock wound thereon as to permit the same to shrink as an incident of cooling without gripping the body of the drum and thus being caused to assume an undesired cross-sectional form; to provide a cooling drum adapted to cause the tubular stock wound thereon to assume an oblate cross-sectional form having a greater cross-sectional dimension in a radial than in an axial direction with respect to the drum, as for convenience in making finished tubes of like cross-section; to provide a device of this character adapted for facility of construction and operation; to provide a cooling drum adapted to receive a large quantity of stock in proportion to its length and to be readily transported; to provide for continuous operation of a tubing machine in combination with the cooling means; and to provide other and more detailed advantages which will become manifest as the description proceeds.

In the accompanying drawings:

Fig. 1 is a front elevation illustrating my improved cooling apparatus in connection with a tube machine;

Fig. 2 is a plan view;

Fig. 3 is a diagrammatic plan view, showing a circular track and two tubing containers;

Fig. 4 is an enlarged sectional view on the line 4—4, Fig. 1;

Fig. 5 is an enlarged sectional view on the line 5—5, Fig. 2, showing the spiral track and roller;

Fig. 6 is a modification of the means for lowering the spiral containers; and

Fig. 7 is a view showing a modification of the arrangement of the tubing containers.

Referring to the drawings, the tubing machine 1 is of any of the ordinary types, having an ejecting nozzle 2. A circular track 3 is located adjacent the tubing machine 1. On this track are two carriages 4, which carry the containers 5 for the tubing as it comes from the tubing machine. The carriages can be independent, but it is preferable to connect them together, to be moved round on the track, by an electric, or other, motor.

While one container is being loaded from the tubing machine, the tubing on the other container is being cooled, after which it is cut into suitable lengths to form respective annular tubes and the said lengths are removed for splicing and vulcanizing.

Mounted on the carriage 4 is a cylindrical standard 6 having a spiral track 7, which is secured to the standard by rivets 8, Fig. 5. The container 5 consists of a tubular shell 9 having a spiral shelf 10, which is substantially of the same pitch as the spiral track 7 of the standard 6. Mounted on respective studs such as the stud 11, secured to the inner side of the container 5, are ball bearing rollers such as the roller 12, of which there are preferably three or more, spaced about the circumference of the container or drum to provide stable, roller support of the drum 5 upon the standard 6, the said rollers being mounted to travel on the track 7. At the upper end of the standard is a guard rail 13, which limits the upward movement of the container.

The base 14 of the carriage is in the form of a plate, which is reinforced by angle irons 15 and 16 that are riveted, or bolted, to the base. Secured to the base 14 are axles 17, which are on radial lines taken from the center of the circular track 3. On the axles are wheels 18, which travel on the tracks.

While the spiral track 7 for supporting the drum 5 is shown in Fig. 1 as being mounted on the standard, the track 7ª may be in the form of an internal spiral, secured to the container 5ª, as illustrated in Fig. 6. Rollers 12ª on the standard 6ª form supports for the container. The rollers and their brackets are of such size as to fit between the convolutions of the track.

When the space will not permit of an annular track 3, two containers 5ᵇ and 5ᶜ may be located side by side on fixed bases. A trough 19 may extend from the tube machine 1ª, past the container 5ᵇ, stopping in front of the other container 5ᶜ so that the tubing, as it comes from the machine, may be coiled first on one container and then on the other container.

The drum 5 or 5ª here shown is adapted to be rotated by gravity in drawing the stock from the tubing machine thereonto, being first run to the top of its range in preparation for receiving the stock and then held to a suitable speed by the hand of the operator in contact with the drum as it receives the stock, but I do not wholly limit my claims to this specific construction, as the same progressive reception and bending of the stock may be effected by various modifications of the structure here shown without departure from the scope of my invention.

In my preferred practice the drum is used in combination with a tubing machine, as contemplated in the foregoing description, and the drum is permitted to rotate at such speed that the tubular stock will pass onto the shelf or flange 10 with but light longitudinal tension and preferably at a little distance from the cylindrical body of the drum, so as not to constrict the drum either in passing thereonto or in shrinking upon cooling, and the stock flattens down by gravity to an oblate cross-sectional form, as will be understood from a comparison of the width of the wound tube as viewed in Fig. 7 with the ratio of radial and axial dimensions of the stock receiving space as viewed in Fig. 1, such oblate cross-sectional form of the tubular stock being desirable in preparing the stock for vulcanization in such form, as described and claimed in my copending applications Ser. No. 757,693, filed December 23, 1924, and Ser. No. 85,735, filed February 3, 1926.

My invention is not wholly limited, however, to apparatus adapted to produce this flattened condition of the stock nor to apparatus adapted to produce such condition of the stock by the force of gravity thereon, as various modifications within the scope of my invention, adapted to provide some or all of the advantages of the specific structure here described, will be within the ordinary skill of or may be devised by those familiar with the art.

I claim:

1. The combination of a vertically arranged container for receiving and cooling rubber inner tubing for automobile tires as it is formed, said container having a spiral shelf for the tubing, the inner edge of the shelf being substantially the same diameter as the inner diameter of the finished inner tubes; and means for supporting the container as it is rotated on its vertical axis.

2. The combination of a container, having an external spiral shelf to receive tubing as it is formed; a standard on which the container is mounted; a spiral track on one of said parts; and means, on the other part, engaging the spiral track and supporting the container as it is turned.

3. The combination of a standard having a spiral track thereon; a container mounted on the standard; and means, on the container, engaging the track, said container having a spiral shelf of substantially the same pitch as the track so that, as the container is rotated, it is moved vertically.

4. The combination of a cylindrical standard; a spiral track secured to the standard; a cylindrical, rotatable container somewhat larger than the standard; studs on the container having rollers engaging the track of the standard; and a spiral shelf on the container arranged to receive rubber tubing as it is projected from a tubing machine.

5. The combination in apparatus for receiving and cooling rubber tubing as it is projected from a tubing machine, of a carriage; a cylindrical standard mounted on the carriage, said standard having a spiral track on its periphery; a cylindrical container mounted on the standard, said container having means engaging the spiral track so that, as the container is turned, it is raised or lowered; and a spiral shelf on the periphery of the container of substantially the same pitch as the track.

6. The combination of a tubing machine; a circular track adjacent said machine; two carriages on the circular track; a standard on each carriage, said standard having spiral tracks; and a container on each standard having means engaging the spiral track said container having a spiral shelf of substantially the same pitch as the spiral track of the standard.

7. The combination of a vertically arranged container for receiving and cooling rubber inner tubing for tires as it is formed, said container having a spiral shelf on its periphery for the tubing, the wall of the container being substantially the diameter of the finished inner tubes; and means for supporting the container so that as it rotates and receives a tube from the tubing machine it will be moved vertically.

8. The combination, with an extruding machine adapted to deliver a hollow tubular strip of rubber stock in a warm and plastic condition, of a plurality of winding drums each adapted to receive the tubular stock directly from the extruding machine and to be rotated to wind the stock thereon, and supporting means operatively connecting the said drums whereby each in succession may be presented to the extruding machine while another is removed therefrom.

9. In combination with means for extruding inner-tube stock in closed tubular form, a cooling drum for inner-tube stock, the said drum comprising a frame structure and means helically disposed thereon for separating adjacent turns of stock helically wound upon the drum, the said means having its successive turns so closely spaced apart axially of the drum as to receive the stock between them only when the stock in cross-section is of less dimension axially of the drum than it is to have in service.

10. In combination with means for extruding inner-tube stock in closed tubular form, a cooling drum for inner-tube stock, the said drum comprising a frame structure and means helically disposed thereon and defining a helical stock-receiving space which in cross-section is of less dimension in an axial than in a radial direction with respect to the drum.

11. In combination with means for extruding inner-tube stock in closed tubular form, a cooling drum for inner-tube stock, the said drum being of a diameter approximately equal to the diameter which the finished inner-tube is to have and comprising a frame structure and a helical flange thereon, the said frame structure and flange being of such dimensions and so positioned as to support a winding of tube stock thereon while permitting longitudinal shrinkage of the stock.

CHARLES H. SEMPLE.